United States Patent

[11] 3,617,001

| [72] | Inventors | Richard G. Grundman<br>Marne, Mich.;<br>Cecil H. Sharpe, Brownsburg, Ind. |
|---|---|---|
| [21] | Appl. No. | 778,002 |
| [22] | Filed | Nov. 14, 1968 |
| [45] | Patented | Nov. 2, 1971 |
| [73] | Assignee | General Motors Corporation<br>Detroit, Mich.<br>Continuation of application Ser. No.<br>617,164, Feb. 20, 1967, now abandoned. |

[54] FUEL NOZZLE CONTAMINANT TRAP
14 Claims, 4 Drawing Figs.

[52] U.S. Cl. .................................................. 239/86,
239/403, 239/443, 239/451, 239/462, 239/533
[51] Int. Cl. .................................................... F02m 55/00
[50] Field of Search........................................... 239/86,
399–434, 464, 443, 444, 537, 534, 575, 453, 584,
548–568, 601, 602, 590–602

[56] References Cited
UNITED STATES PATENTS

| 1,615,457 | 1/1927 | Jorgensen.................. | 239/404 |
| 1,759,297 | 5/1930 | Burn.............................. | 239/86 |
| 1,804,413 | 5/1931 | Groff............................. | 239/86 |
| 1,876,377 | 9/1932 | Wilson ......................... | 239/462 |
| 1,964,218 | 6/1934 | Schargorodsky............ | 239/86 |
| 1,990,875 | 2/1935 | Mock ........................... | 239/86 |
| 2,458,118 | 1/1949 | Tursky ......................... | 239/451 |
| 2,893,647 | 7/1959 | Wortman ..................... | 239/403 |
| 2,954,172 | 9/1960 | Grundman ................... | 239/443 |

FOREIGN PATENTS

| 70,056 | 9/1915 | Austria......................... | 239/533 |
| 424,321 | 3/1911 | France ......................... | 239/533 |

*Primary Examiner*—Lloyd L. King
*Attorneys*—Paul Fitzpatrick and E. W. Christen

ABSTRACT: A fuel spray nozzle for use with contaminated fuels embodies a trap for particles such as sand grains and lint. One form is made up of disks with radial slots and rings or flanges defining circumferential bars, to provide plural tortuous restricted flow paths ahead of the nozzle swirl ports. The other form has radial passages joining concentric annular axial passages.

PATENTED NOV 2 1971

3,617,001

INVENTORS
Richard G. Grundman
BY & Cecil H. Sharpe

Paul Fitzpatrick
ATTORNEY

FUEL NOZZLE CONTAMINANT TRAP

This application is a continuation of our application Ser. No. 617,164 filed Feb. 20, 1967, now abandoned.

Our invention relates, so far as the preferred use is concerned, to fuel spray nozzles such as are employed in gas turbines. In a more general aspect, the invention relates to contaminant traps adapted to protect orifices through which fluids flow from being blocked by rigid contaminant particles, the trap being adapted to intercept particles incapable of passing through the orifice.

In general, the trap of our invention involves a labyrinth or maze of tortuous passages of small cross-sectional area, preferably just smaller than the downstream orifice to be protected against blockage. With a structure according to our invention, debris such as large grains of sand or the like are trapped but, on the other hand, small particles may pass readily through the trap without clogging it. Likewise, flexible filamentary contaminants such as pieces of lint or fiber usually pass through the trap and, if they should catch, do not block the flow unless a great deal manages to accumulate. The passages through the trap are rather widely spaced, and therefore fibers do not accumulate and block the trap as they do on a screen with closely spaced holes. Our trap also is highly useful in stopping debris generated by the fuel system, such as bits of metal and elastomers from the fuel pumps and controls.

It is, of course, commonplace to provide strainers, screens, or filters in fuel lines to intercept contaminants which might clog small passages in fuel nozzles or other apparatus. However, while such screens or filters may protect the downstream device, they are themselves subject to clogging. If, for example, an aircraft engine fails because of fuel starvation, it is not material to the crew whether the blockage occurs in the fuel nozzle or in a filter.

Our invention has been conceived as part of a program to develop fuel spray nozzles with a high degree of resistance to and tolerance of contaminants, since it may be necessary in some cases to relax the preferred standards for cleanness of fuel used in aircraft engines. Our sediment trap is preferably used in connection with a fuel spray nozzle which has special adaptation to contaminated fuel. The fuel nozzle spray tip structure is the subject of our copending application Ser. No. 617,142 for Fuel Spray Nozzle filed Feb. 20, 1967 U.S. Pat. No. 3,477,647. The contaminant trap of this application, however, is not limited in its use to this particular spray nozzle.

In aircraft gas turbines, it has been common practice to use fuel nozzles in which atomization is effected by swirling the fuel in a chamber from which it flows over the lip of an opening at one end of the chamber. Because of the wide range of flow, it is necessary for aircraft gas turbines to have nozzles of the duplex type with a primary set of fuel swirl ports of small size and a secondary set of swirl ports of relatively large size. The result is that high swirl velocities can be obtained with the small ports at low flow rates, and adequate capacity is provided by use of both sets of ports at high flow rates. Fuel nozzles of this general character are shown, for example, in U.S. Pats. to Wortman, No. 2,893,647 and to Grundman, No. 2,954,172. Fuel flow to the secondary ports may be shut off when the flow rate is small by valve mechanism in the nozzle or by separate control means.

It is feasible to filter contaminants from the lines to the small primary fuel ports, but filtration is not a satisfactory solution to the contaminated fuel problem so far as the large secondary ports with high flow rates are concerned. Our invention is directed to this problem.

The nature of our invention and the advantages thereof will be clear to those skilled in the art from the succeeding detailed description of preferred embodiments and the accompanying drawings thereof.

Figure 1:
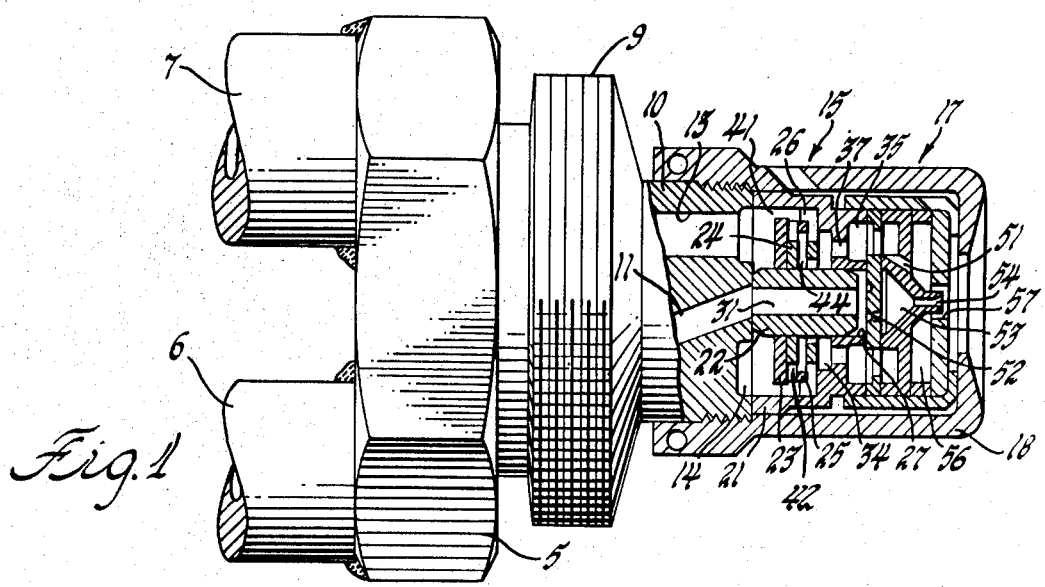
FIG. 1 is a longitudinal sectional view of a fuel nozzle.

Referring generally to the environment of our invention, the fuel spray nozzle comprises a body 5 having a first inlet conduit 6 for the primary (small flow) fuel and a second inlet 7 for the secondary or large flow fuel. The body includes a threaded portion 9 by which it may be secured in place in a combustion chamber and terminates in an externally threaded boss 10. Primary inlet 6 connects to a passage 11 terminating at the center of the boss and the secondary inlet communicates with a passage 13 terminating in an annular recess 14 in the face of boss 10.

The principal operative parts of the nozzle comprise the sediment trap indicated generally by 15 and the fuel spray assembly indicated generally at 17. These are retained in place on the body by an airshroud and retainer 18 which threads onto boss 10. The retainer bears against the spray assembly which in turn bears against the sediment trap, which abuts the face of boss 10. The contaminant trap 15 (hereinafter called simply a trap) comprises in this embodiment six parts; a generally cup-shaped annular casing 21, a hollow stem 22 fixed axially within the casing, a first annular plate 23, a second annular plate 24 which is radially slotted, a ring 25, and a third annular plate 26 also radially slotted. The stem 22 is brazed in place in a central opening 27 in the end of the casing. Plate 26 fits within and is piloted in the casing, bearing against a shoulder 29. Ring 25 of square cross section fits within a shallow recess 30 in plate 26 which centers the ring. Plate 24 is a slip fit on stem 22 and bears against ring 25. Plate 23 is a press fit on the stem and bears against plate 24, retaining plates 24 and 26 and ring 25 on the stem and in the casing.

The upstream end of stem 22 is aligned with passage 11 and the stem defines a primary fuel passage 31 into the spray tip 17. The upstream face 33 of the casing bears against boss 10 and is piloted within the retainer 18. The casing 21 defines a recess 34 in the upstream side of the end wall around the stem 22 and a recess 35 in its downstream side spaced from the primary fuel passage. Four axial ports 37 connect recess 34 with recess 35 to provide a passage for secondary fuel into the spray tip. Thus, the secondary fuel enters the space between casing 21 and stem 22 through passage 13 and annulus 14 of the body and proceeds in a generally axial direction through the trap into the spray tip.

Figure 3:
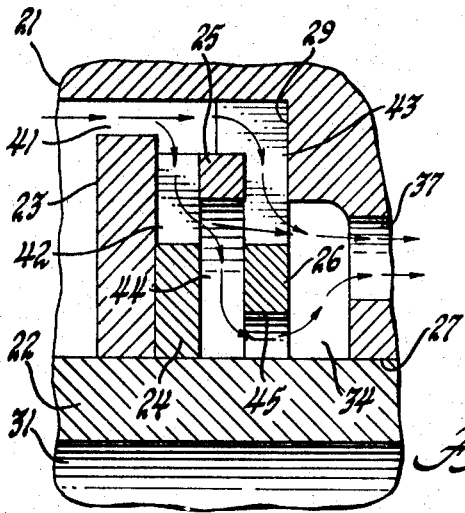
FIG. 3 is a greatly enlarged partial sectional view of the contaminant trap of FIGS. 1 and 2.

Proceeding now to the flow path through the trap, with particular attention to the broken arrows on FIG. 3, the fuel must first flow through the annular gap 41 between plate 23 and the casing. The flow then splits into numerous parallel-connected paths, some of it flowing radially inward through each one of the radial slots 42 in the second plate 24. As illustrated, there are six of these slots, but the number is to some extent a matter of design choice. They should not be too close together. Some of the fluid may also flow through each of the radial slots 43 in the third plate 26. Ring 25 provides a separation between these two sets of paths. The fluid passing through slots 42 flows into the space 44 inside of ring 25 from which it may escape through various parallel-connected paths; it may flow through the parallel-connected gaps between ring 25 and the bottom of slots 43, or may flow through the gap between the inner margin 45 of plate 26 and the stem connected in parallel to the slots 43. Fluid leaving third plate 26, either through slots 43 or the interior opening 45, is discharged into the annular recess 34 within the casing from which it then flows through the outlets 37. It will be noted that all the fluid must pursue a tortuous or zigzag path and that it must flow through the relatively small passages defined by the slots 42 and 43, by the annular spacing between the perimeter of plate 23 and the casing, between the bottoms of slots 42 and 43 and the interior of ring 25, and between the interior of plate 26 and the stem. The thickness of the webs of plates 24 and 26 and of ring 25 and the radial clearances mentioned and the widths of the slots are all of about the same dimension, which is such as to make the passages through which the fuel flows slightly smaller than the downstream orifice which is to be protected from clogging.

In a specific example, in a fuel nozzle which the downstream secondary fuel swirl ports 51 are 0.034 inch in diameter, the axial widths of plate 42, ring 25, and plate 43 within the recess are each approximately 0.025 inch; likewise, the radial clearance between ring 25 and the bases of slots 42 and 43, between ring 25 and the casing, and between the interior of plate 26 and the stem. In this case the spacing between plate 23 and the interior of the casing is approximately 0.017 inch. At this point, of course, there is a complete 360° annular passage between the plate and the casing.

As will be apparent, contaminants such as large grains of sand and chips and the like may readily be caught by the trap. Lint which can pass through the swirl ports may also accommodate itself to the tortuous path. In the example noted, the inside diameter of casing 21 is about 0.44 inch, so the trap is small enough to be fitted into a fuel nozzle of normal size. Another significant fact about the trap is that the size and number of the passages is such, in connection with the tortuousness of the paths, that there is sufficient fuel velocity and turbulence to prevent coagulation of fine dirt in the trap.

Experience with the trap has shown that the major part of the large sand grains are caught at the first annular gap 41. Because of the considerable length of this, extending in a complete circle around plate 23, a considerable amount of debris can be accumulated without throttling flow to any undesirable extent. Relatively long and thin rigid pieces may catch at this point but are also subject to being caught further within the trap.

Figure 2:
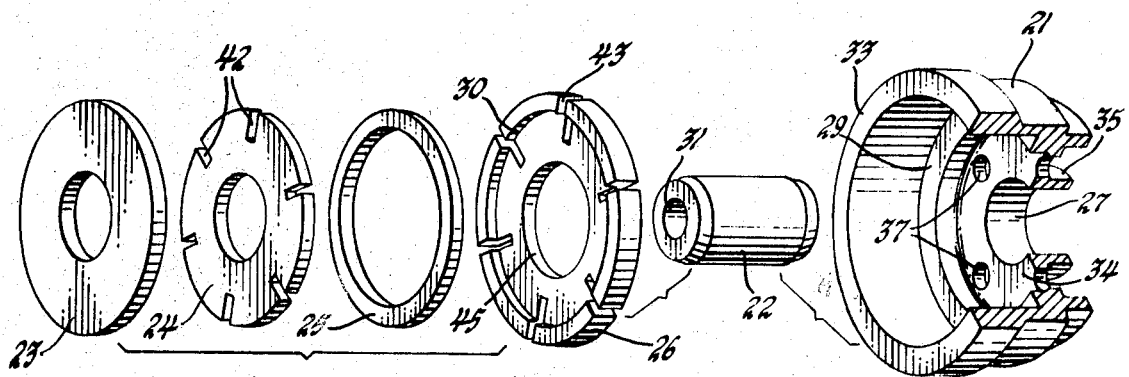
FIG. 2 is an exploded axonometric view of the contaminant trap included in the nozzle.

Experience has indicated that a very important feature of the trap, so far as handling lint and other relatively long flexible fibers is concerned, is that the parallel-connected passages such as those defined by slots 42 or 43, for example, are spaced a considerable distance apart. Apparently, in a structure of the scale with which we are concerned here, spacing between the passages through which the fuel flows should be something of the order of one-tenth inch. In the trap of FIGS. 2 and 3, the spacing is somewhat greater than this figure. This avoids the effect commonly observed with screens that particles of lint drape themselves over the narrow wires between the openings and soon pile up and clog the screen. The reasons for this freedom from clogging are not entirely understood, but it is an observed phenomenon that the trap with widely spaced passages does not accumulate lint to any extent. Such lint after passing through the trap can also pass through the relatively large secondary swirl ports.

Figure 4:
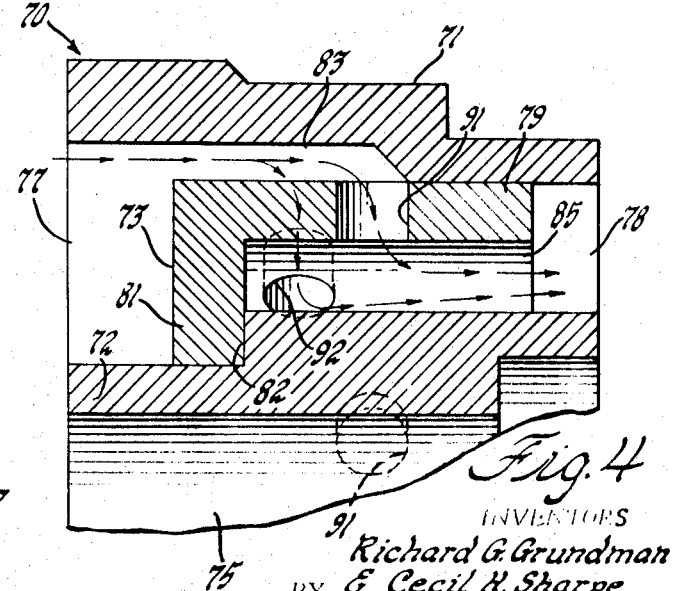
FIG. 4 is a longitudinal sectional view of a second form of contaminant trap, also greatly enlarged.

FIGS. 4 is a view to the same scale as FIG. 3 of a second form of sediment trap based upon the results observed in tests of the form of FIGS. 2 and 3. The principal objects in the conception and design of this second form of trap were to simplify the structure and facilitate manufacture, which have been accomplished. Testing has shown that the simplified trap of FIG. 4 also is highly effective and, because of its relative simplicity and apparently equal effectiveness, the trap of FIG. 4 is at present the preferred form. The trap 70 shown in FIG. 4 comprises a casing 71, a hollow stem 72, and a ring 73. The casing 71 and the stem 72 correspond to parts 21 and 22 of the first form and are installed between the boss 10 and spray tip 17 in the same way as the other trap. For this reason, the installation of the trap can be understood from FIG. 1. The left-hand or upstream edges of the casing and stem bear against the boss 10 and the downstream or right-hand edges bear against the spray tip. Primary fuel flows through the central passage 75 in the stem and into the primary swirl ports. Secondary fuel is discharged from the annulus 14 of the boss 10 into the annular space 77 upstream of ring 73 and is discharged into the annular space 78 between the body and stem at the downstream end of the trap.

The ring 73 comprises a cylindrical part 79 and an inwardly directed flange 81. Flange 81 is piloted on the reduced upstream end of the stem and bears against a shoulder 82. These two parts are brazed together. Casing 71 fits on the downstream end of ring 73 and is brazed in place with the ends of the casing coplanar with the ends of the stem. The structure of the ring in its preferred form is very simple; it is provided with ten parallel-connected radial holes connecting an annular space 83 between the casing and ring with the annular space 85 between the ring and stem. These holes are in two groups of holes staggered axially of the trap. There are five holes 91 spaced 71° apart and five holes 92 slightly upstream of holes 91 and spaced 36° circumferentially from holes 91. In the particular trap illustrated, the annular gap at 83 between the casing and ring is 0.022 of an inch wide. The holes 91 and 92 are approximately 0.040 inch in diameter and the thickness of the cylindrical portion 79 of the ring is about 0.030. The width of the gap 85 between the ring and stem is about 0.040. With this arrangement there is nearly one-tenth inch distance between the adjacent edges of adjacent holes 91 or 92. The holes 91 and 92 are 0.040 inch in diameter for use with a nozzle having secondary swirl ports 0.045 inch in diameter and are thus of slightly less diameter than the swirl ports. The total area of the ten parallel-connected holes is about three times that of the two swirl ports, so that velocity through them is adequate but plugging of several holes would not create a failure of flow through the nozzle.

The flow through the trap is axially through passage 83, then radially through ports 91 and 92, and then again axially through passage 85. Although the simpler structure of this trap involves fewer convolutions, it embodies the same concepts of passing through a gap narrower than the swirl ports to be protected and then passing in a zigzag or tortuous manner through relatively widely spaced parallel-connected holes or gaps approximately the dimension of the spray ports downstream.

It is not necessary to describe in detail the spray tip 17, particularly since various spray tips may be used with the sediment trap, and also because the spray tip is described in the application referred to above. It may be noted, however, that the primary fuel may be finely filtered so that it does not present the sediment problem. The sediment is ordinarily carried into the fuel nozzle by the secondary fuel. The primary fuel flows through swirl ports 52 into a chamber 53 from which it flows through an outlet 54. The secondary fuel is swirled in a chamber 56 from which it flows over the lip defined by the circular opening 57.

The desirability of our contaminant trap as means for intercepting objects too large to pass the spray ports or other downstream orifices and its relative freedom from blocking (due mainly to the facts that the overall flow area is relatively large permitting a considerable degree of blocking without substantial effect on nozzle discharge and that the ports are spaced to avoid draping by lint) have been demonstrated by experience, and it is clear that the trap is of substantial value in improving the tolerance of gas turbine fuel systems to dirty fuel.

The description of the preferred embodiment of the invention for the purpose of explaining the principles thereof is not to be considered as limiting or restricting the invention, since many modifications may be made by the exercise of skill in the art.

We claim:

1. A fuel spray nozzle comprising, in combination, means defining a fuel discharge orifice of a predetermined transverse dimension and a contaminant trap adapted to intercept rigid contaminant particles larger than said dimension without blocking the trap and to pass smaller contaminant particles and flexible filamentary bodies to the discharge orifice, the trap comprising structure defining a plural number of parallel-connected tortuous fluid flow paths of maximum transverse dimension slightly less than that of the orifice, the nozzle being of a dual orifice type with primary and secondary fuel spray means, and the contaminant trap being of annular form defining an inlet through the trap to the secondary fuel spray means and defining within the inner boundary of the annulus an inlet to the primary fuel spray means.

2. A fuel spraying system comprising, in combination, fuel spraying means defining a fuel discharge orifice of a predetermined transverse dimension and a contaminant trap disposed for flow of fuel through the trap to orifice, the trap being adapted to trap rigid contaminant particles larger than said dimension without blocking the trap and to pass smaller contaminant particles and flexible filamentary bodies to the discharge orifice, the trap comprising structure defining, in flow sequence, a passage having a width slightly less than the transverse dimension of the orifice and having a total area at least several times that of the discharge orifice, a plural number of parallel-connected flow paths of transverse dimension slightly less than that of the orifice, the flow paths being substantially at right angles to the said passage, and a conduit adapted to connect the said paths to the means defining the orifice.

3. A system as recited in claim 2 in which the parallel-connected flow paths are spaced apart by distance greater than the transverse dimension of the flow paths.

4. A system as recited in claim 3 in which the said distance is at least twice the transverse dimension of the flow paths.

5. A system as recited in claim 3 in which the said structure comprises alternating abutting slotted plates and bars, the slots in the plates overlapping the bars.

6. A system as recited in claim 5 in which the plates and bars are annular and the slots are radial.

7. A system as recited in claim 2 in which the trap comprises a casing, a ring within the casing, and a stem within the ring, the casing and ring defining the said passage between them, the ring having circumferentially spaced holes defining the said paths, and the ring and stem defining the said conduit.

8. A system as recited in claim 7 in which the spacing between the said holes is at least substantially twice the transverse dimension of the holes.

9. A system as defined in claim 8 in which the fuel spraying means is mounted with the trap in a fuel spray nozzle assembly.

10. A trap for removing contaminants from fuel to prevent stoppage of a restricted fuel discharge orifice comprising, in combination, an annular casing, a stem extending along the axis of the casing and fixed therein, a first annular plate fixed to the stem and spaced from the casing to define a fuel inlet between the periphery of the plate and the casing, a second plate abutting the downstream side of the first plate and having slots extending radially inwardly from the periphery of the second plate, a ring abutting the downstream side of the second plate, having the inner periphery of the ring radially outward of the inner end of said slots and the outer periphery spaced from the casing, and a third plate mounted in the casing abutting the downstream side of the ring and with the downstream side of the third plate abutting a shoulder in the casing, the third plate having slots extending radially outwardly and inwardly beyond the said ring and inwardly beyond the said shoulder, the casing defining at least one outlet for fuel downstream of the third plate and radially outward of the stem.

11. A trap as recited in claim 10 in which the third plate is radially spaced from the stem.

12. A trap as recited in claim 11 in which the outlet is radially outward of the inner surface of the third plate.

13. A trap as recited in claim 10 in which the first plate is a tight fit on the stem and retains the second plate and the ring.

14. A trap as recited in claim 13 in which the first plate also retains the third plate.

* * * * *

PO-1050
(5/69)

UNITED STATES PATENT OFFICE
CERTIFICATE OF CORRECTION

Patent No. 3,617,001          Dated    November 2, 1971

Inventor(s) Richard G. Grundman and Cecil H. Sharpe

It is certified that error appears in the above-identified patent and that said Letters Patent are hereby corrected as shown below:

Column 4, line 4, "71°" should read -- 72° --.

Signed and sealed this 1st day of August 1972.

(SEAL)
Attest:

EDWARD M. FLETCHER, JR.      ROBERT GOTTSCHALK
Attesting Officer             Commissioner of Patents